B. R. BONNEY.
SPRAY HOG OILER.
APPLICATION FILED APR. 12, 1916.
1,233,286.
Patented July 10, 1917.
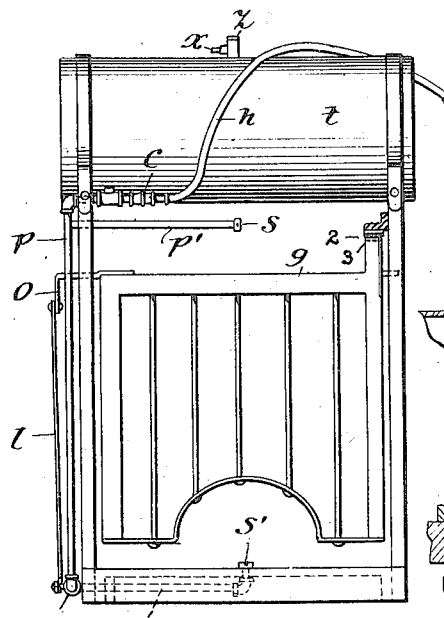
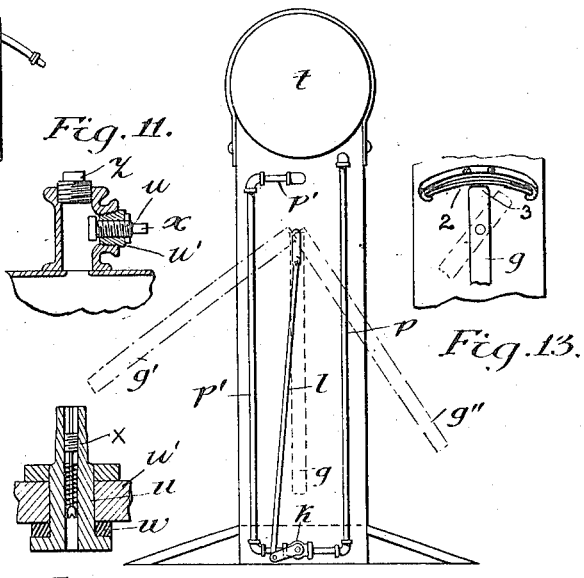
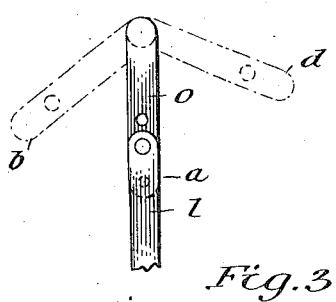
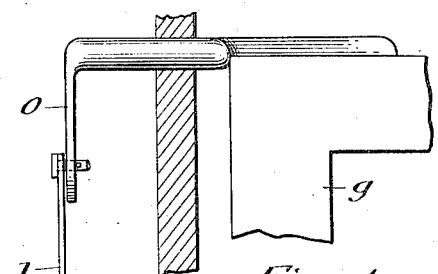
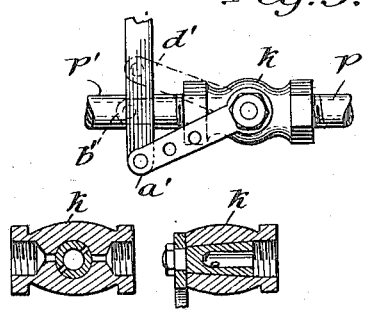
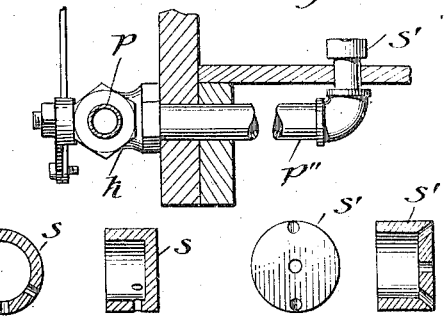
Witnesses,
Carroll W. Kimball.
John Kimball
Inventor.
Bick R. Bonney
by Clem F. Kimball
Attorney

UNITED STATES PATENT OFFICE.

BICK R. BONNEY, OF OMAHA, NEBRASKA, ASSIGNOR TO J. W. ELWOOD, OF OMAHA, NEBRASKA.

SPRAY HOG-OILER.

1,233,286.  Specification of Letters Patent.  Patented July 10, 1917.

Application filed April 12, 1916.  Serial No. 90,768.

*To all whom it may concern:*

Be it known that I, BICK R. BONNEY, a citizen of the United States, residing at Omaha, in the county of Douglas and State of Nebraska, have invented a new and useful Spray Hog-Oiler, of which the following is a specification.

My invention relates to improvements in hog oilers in which a spray is thrown upon the hog as he passes through an obstructed gate way or passage way; and the objects of my improvements are—1st, to provide a positive means of throwing oil or other disinfecting liquid in a spray form so as to reach every part of the hog; 2nd, to provide a means whereby such spray will be released by act of the hog passing through the gate way or other obstructed opening; 3rd, to provide a means for increasing the intensity of the spray by air pressure; 4th, to provide an auxiliary means for spraying animals otherwise than by use of the obstructed way or gate.

I attain these objects by the mechanism illustrated in the following drawing, in which—

Figure 1 is a side elevation with spray hose attached; Fig. 2, is an end elevation with the spray hose detached; Fig. 3 is a side elevation of cut off and lever to operate the same; Fig. 4 is a partial cross section of frame, showing side elevation of cut off, lever and lower spray head; Figs. 5 and 6 are respective cross sections of the spray cut off; Figs. 7 and 8 are respective cross sections of the head of the upper spray; Figs. 9 and 10, are respective elevation and cross section of the lower spray; Fig. 11 is a cross section of filling spigot and air valve; Fig. 12 is a cross section of the air valve; Fig. 13 is a side elevation of a detail of retarding means shown in section in Fig. 1.

Similar letters refer to similar parts throughout the several views.

The tank $t$ is suitably arranged to hold the oil or spray solution to be thrown upon the hogs or other animals and is placed upon a suitable frame, $eee$. The frame $eee$ is so disposed relative to the tank $t$ as to form an opening or gate way through which the hog or animal which it is desired shall be sprayed with the solution shall pass. A pipe $p$ extends from the tank $t$ near its bottom to the cut off $k$. The cut off $k$ is arranged to control the passage of the liquid from the supply pipe $p$ to such other pipes as $p'$ and $p''$ as may be employed. In the frame $eee$ is placed a swinging gate $g$, here shown and preferably so hinged at its upper end so as to swing in a vertical position by the force of gravity. On one end of the gate the trunnion is extended and formed into an arm $o$ and a suitable rod $l$ connects the arm $o$ with the arm $a'$ of the cut-off $k$. The arm $o$ and the arm $a'$ of the cut-off $k$ may be supplied with suitable holes for the adjustment of the cut off $k$ relative to the movement of the swinging gate $g$. Leading from the cut off $k$ are one or more pipes as $p'$ and $p''$, here shown to be arranged with one above and one beneath the middle of the gate way though a larger number may be used. At the end of the pipe $p'$ is placed a spray head $s$ having fine apertures adapted to throw the oil or solution passing through it in the form of a spray. A similar head may be attached to the pipe $p''$ for similar purposes. For convenience a common commercial pipe cap is used for the spray heads $s$ and $s'$. The spray head $s$ is perforated on a plane parallel with the top of the cap and so as to throw the spray both downward and to each side. The spray head $s'$ is perforated through the top of the cap so as to throw the spray both upward and forward and back with reference to the movement of the hog through the gate $g$. To an extension 3 of the side of the gate $g$ is applied a retarding means or spring 2. The spring 2 is so arranged that after the gate $g$ swings toward the center the pressure of the spring 2 upon the extended portion of the extension 3 of the gate $g$ prevents continued oscillation of the gate repeatedly opening the valve $k$ and causing a flow through the spray heads $s$ and $s'$ after the animal has passed through the gate.

A cock $c$ may also be connected with pipe fittings to the tank $t$ and a hose $h$ with a nozzle end attached. This can be used for spraying animals by hand where it is desired to spray them for special purposes or where they are too large to pass through the gate way that may be provided.

The cut off $k$ is arranged with an ordinary tapering plug so that when the lever $a'$ is in the position shown and in the position $d'$ as shown in Fig. 3 the cut off will be closed but when the lever $a'$ is in the position $b'$ it will be open. The arm $o$ of the hinge eye is arranged to close the valve when the gate $g$ hangs in a normal position and when by the movement of the arm $o$, due to the swinging of the gate $g$ in either direction, the arm $o$ is carried to a suitable position as $b$, the lever $a'$ of the cut off $k$ is carried to the position of $b'$, and when the arm $o$ is carried to another position as $d$, the lever $a'$ of the cut off $k$ is moved to the position of $d'$.

When gravity is not sufficient for the purpose of spraying the oil or other solution, an air tube $u$ may be provided through which air is pumped forcing a pressure of air into said tank, by the common tire pump, the elasticity of which air will force the oil through the pipe $p$ if the cut off $k$ is opened and through the hose $h$ if the cock $c$ is opened. The tube $u$ has a valve $x$ adapted to check the air from passing outward through said tube $u$ when it is forced into and through it. As preferably formed the tube $u$ is a commerical tire tube such as is used on bicycles or motorcycles, passed through a commercial pipe plug $u'$ with a soft packing ring at $w$. A suitable commercial pipe fitting is then attached to the tank into which the plug $u'$ having a tube $u$ with a valve $x$ is screwed. When a commercial T is used the tube $u$ may be placed in the side tapping and a filling plug $z$ may be screwed into the top for removal for filling tank without the removal of the tube $u$ as shown in Fig. 11. The tank $t$ is first partially filled with oil or spray solution. A suitable pressure of air is then pumped into the tank $t$ through the tube $u$ by any ordinary tire pump. The hose $h$ is used by simply turning the cock $c$ and directing it toward the animal to be sprayed. The hose coupling $c$ is connected so that the hose $h$ may be disconnected from the cock $c$ except when in use. The oiler is placed for general use in some opening in the fence or gate way or where the animals or hogs will push through the swinging gate $g$. When an animal passes through the gate $g$ it is swung to a position as $g''$ at which point before the animal has passed through, the cut off $k$ is opened and the oil or spray solution will be sprayed out through the spray heads $s$ and $s'$ over and underneath the animal passing through the frame. When the animal has passed far enough so that the gate $g$ swings over him as to a position corresponding with $g'$ in Fig. 2, the cut off $k$ is again closed. After the animal has passed clear through the gate drops quickly behind it to the normal position, quickly opening the cut off $k$ or leaving it closed. The successive movment of the gate $g$ by the animal passing through will thus spray it underneath and on top with whatever solution is placed in the tank $t$.

The bottom of the gate $g$ is arranged with an arch or opening cut away in the middle so the animal will first attempt to go through or so it can stick its nose through. In this way the hog or animal is induced to go through the gate and get the oil or liquid and induced to pass through the middle of the gate way over and under the spray heads.

I am aware that prior to my invention, various devices have been used that by movement of the animal or hog against them will throw a jet of oil upon a surface against which the hog or animal is rubbing, but what I claim and desire to secure by Letters Patent is:—

1. A horizontal containing tank located transversely above a gateway; spray heads in said gateway and pipes leading from said tank to said spray heads; a cut-off valve in the pipe between the tank and spray heads; a swinging gate hinged at its upper end in said gateway; a trunnion of said swinging gate formed into an arm, a rod connecting said arm with the arm of said cut-off valve.

2. A horizontal containing tank located transversely above a gateway; spray heads in said gateway and pipes leading from said tank to said spray heads; a cut-off valve in the pipe between the tank and spray heads; a swinging gate hinged at its upper end in said gateway; a trunnion of said swinging gate formed into an arm, a rod connecting said arm with the arm of said cut-off valve and an air check valve in said tank.

3. A horizontal containing tank located transversely above a gateway; spray heads in said gateway and pipes leading from said tank to said spray heads; a cut-off valve in the pipe between the tank and spray heads; a swinging gate hinged at its upper end in said gateway; a trunnion of said swinging gate formed into an arm, a rod connecting said arm with the arm of said cut-off valve; an air check valve in said tank and a detachable spray with hose.

4. A horizontal containing tank located transversely above a gateway; spray heads in said gateway and pipes leading from said tank to said spray heads; a cut-off valve in the pipe between the tank and spray heads; a swinging gate hinged at its upper end in said gateway; a trunnion of said swinging gate formed into an arm; a rod connecting said arm with the arm of said cut-off valve; an air check valve in said tank; a detachable spray with hose and a retarding means adapted to retard said gate at the center of its oscillation.

5. A containing tank located transversely above a gateway; spray heads in said gateway and the pipes leading from said tank to said spray heads; a cut-off valve in the pipe between the tank and spray heads; a swinging gate in said gateway having one of its trunnions bent vertically downward formed into a vertical arm; a horizontal arm operating the said cut-off and a rod connecting said vertical arm with said horizontal arm; said gate having an arch formed at its lower edge and a retarding means adapted to retard the gate in the center of its oscillation.

BICK R. BONNEY.

Witnesses:
HENRY PETERSON,
LYNN S. ALBERTI.